US012496743B2

(12) United States Patent
Shindo et al.

(10) Patent No.: US 12,496,743 B2

(45) Date of Patent: Dec. 16, 2025

(54) CARTRIDGE AND STAPLER

(71) Applicant: Max Co., Ltd., Tokyo (JP)

(72) Inventors: Takushi Shindo, Tokyo (JP); Futoshi Kameda, Tokyo (JP)

(73) Assignee: Max Co., Ltd., Tokyo (JP)

( * ) Notice: Subject to any disclaimer, the term of this patent is extended or adjusted under 35 U.S.C. 154(b) by 15 days.

(21) Appl. No.: 18/396,381

(22) Filed: Dec. 26, 2023

(65) Prior Publication Data

US 2024/0208104 A1 Jun. 27, 2024

(30) Foreign Application Priority Data

Dec. 26, 2022 (JP) ................................ 2022-207984

(51) Int. Cl.
*B27F 7/38* (2006.01)
*B42B 5/00* (2006.01)

(52) U.S. Cl.
CPC . *B27F 7/38* (2013.01); *B42B 5/00* (2013.01)

(58) Field of Classification Search
CPC ..... B25C 5/0207; B25C 5/025; B25C 5/0278; B25C 5/0292; B25C 5/1603; B25C 5/162; B25C 5/1689
USPC .......................................................... 227/135
See application file for complete search history.

(56) References Cited

U.S. PATENT DOCUMENTS

2019/0143557 A1 5/2019 Shimizu et al.
2019/0275697 A1 9/2019 Shimizu et al.
2021/0008754 A1 1/2021 Shimizu et al.
2021/0237247 A1* 8/2021 Fish ...................... B25C 5/1603

FOREIGN PATENT DOCUMENTS

DE 29603812 U1 6/1996
EP 3482895 A1 5/2019
JP 2019-089322 A 6/2019

OTHER PUBLICATIONS

May 31, 2024—(EP) Extended EP Search Report—EP App 23219681.6.

* cited by examiner

*Primary Examiner* — Praachi M Pathak
(74) *Attorney, Agent, or Firm* — Banner & Witcoff, Ltd.

(57) ABSTRACT

There is provided a cartridge to be mounted on a stapler, and a stapler. The cartridge includes: a cartridge main body configured to accommodate a staple; a lever attached to the cartridge main body to be displaceable with respect to the cartridge main body; and a fixing portion for fixing the cartridge to the stapler when the cartridge is loaded on the stapler. The fixing portion is located at a first position in a fixed state where the cartridge is fixed to the stapler, and is located at a second position in a released state where the fixed state is released. The lever has a moving portion that moves the fixing portion to the second position when the lever is displaced in a first direction and a second direction with respect to the cartridge main body.

11 Claims, 8 Drawing Sheets

CARTRIDGE AND STAPLER

CROSS-REFERENCE TO RELATED APPLICATIONS

This application is based on and claims priority under 35 USC 119 from Japanese Patent Application No. 2022-207984 filed on Dec. 26, 2022, the contents of which are incorporated herein by reference.

TECHNICAL FIELD

The present disclosure relates to a cartridge to be loaded on a stapler and a stapler.

BACKGROUND ART

In the related art, there is known an electric stapler that automatically performs a binding process by driving a staple into a sheet bundle by a driver mechanism and folding leg portions of the staple penetrating the sheet bundle by a clincher portion. The electric stapler is mounted in, for example, an image forming apparatus that forms an image on a sheet or a post-processing apparatus that performs post-processing.

A cartridge for accommodating a refill in which a plurality of staples are stacked is detachably attached to a stapler main body. As a method of removing the cartridge from the stapler main body, a plurality of methods are adopted. For example, there is a type in which a finger is hooked on a knob of a cartridge and the knob is rotated in a predetermined direction to remove the cartridge from a stapler main body, and a type in which a knob of a cartridge is gripped and pulled out rearward to remove the cartridge from a stapler main body.

JP2019-089322A discloses a stapler in which an operation unit is rotatably attached to an upper surface of a cartridge main body via a link member, and the operation unit is rotated to take out the cartridge from a stapler main body.

However, in a case of the type of the related art in which the knob of the cartridge of JP2019-089322A is rotated, the cartridge cannot be removed by an operation of gripping the knob and pulling the knob rearward. Further, in a case of the type in which the knob of the cartridge is gripped and pulled, the cartridge cannot be removed by an operation of rotating the knob. When the knob of the cartridge is operated in a direction different from an original operation direction, not only the cartridge cannot be removed but also the cartridge may be dropped or the cartridge may be damaged.

SUMMARY OF INVENTION

The present disclosure provides a cartridge and a stapler capable of realizing various operability in a case of removing the cartridge from a stapler main body.

According to an illustrative aspect of the present disclosure, a cartridge to be mounted on a stapler includes: a cartridge main body configured to accommodate a staple; a lever attached to the cartridge main body to be displaceable with respect to the cartridge main body; and a fixing portion for fixing the cartridge to the stapler when the cartridge is loaded on the stapler. The fixing portion is located at a first position in a fixed state where the cartridge is fixed to the stapler, and is located at a second position in a released state where the fixed state is released. The lever has a moving portion that moves the fixing portion to the second position when the lever is displaced in a first direction and a second direction with respect to the cartridge main body.

According to another illustrative aspect of the present disclosure, a stapler includes: a main body including a loading portion in which a cartridge is loaded and a fixing portion that fixes the cartridge loaded in the loading portion into the loading portion; and a lever attached to the main body to be displaceable with respect to the main body. The fixing portion has a protruding portion that is located at a first position in a fixed state where the cartridge is fixed to the loading portion and is located at a second position in a released state where the fixed state of the cartridge is released. The lever has a moving portion that moves the protruding portion from the first position to the second position when the lever is displaced in a first direction and a second direction different from the first direction with respect to the main body.

According to the present disclosure, by displacing the lever in the first direction or the second direction, it is possible to remove the cartridge from the stapler, thereby realizing various operability. Accordingly, it is possible to prevent an erroneous operation when the cartridge is removed from the stapler.

DESCRIPTION OF EMBODIMENTS

Hereinafter, a preferred embodiment of the present disclosure will be described in detail with reference to the accompanying drawings.

Configuration Example of Electric Stapler 1

An electric stapler 1 according to the present embodiment is mounted, for example, in an image forming apparatus that forms a predetermined image on a sheet or in a post-processing apparatus connected to a downstream side of the image forming apparatus in a sheet transport direction. The electric stapler 1 performs a binding process on a sheet bundle including a plurality of sheets on which predetermined images are formed by the image forming apparatus using a staple. Specifically, the electric stapler 1 performs the binding process on the sheet bundle by sequentially performing a clamping step of clamping the sheet bundle, a penetrating step of penetrating a staple through the clamped sheet bundle, and a clinching step of folding leg portions of the staple penetrating the sheet bundle.

Figure 1:
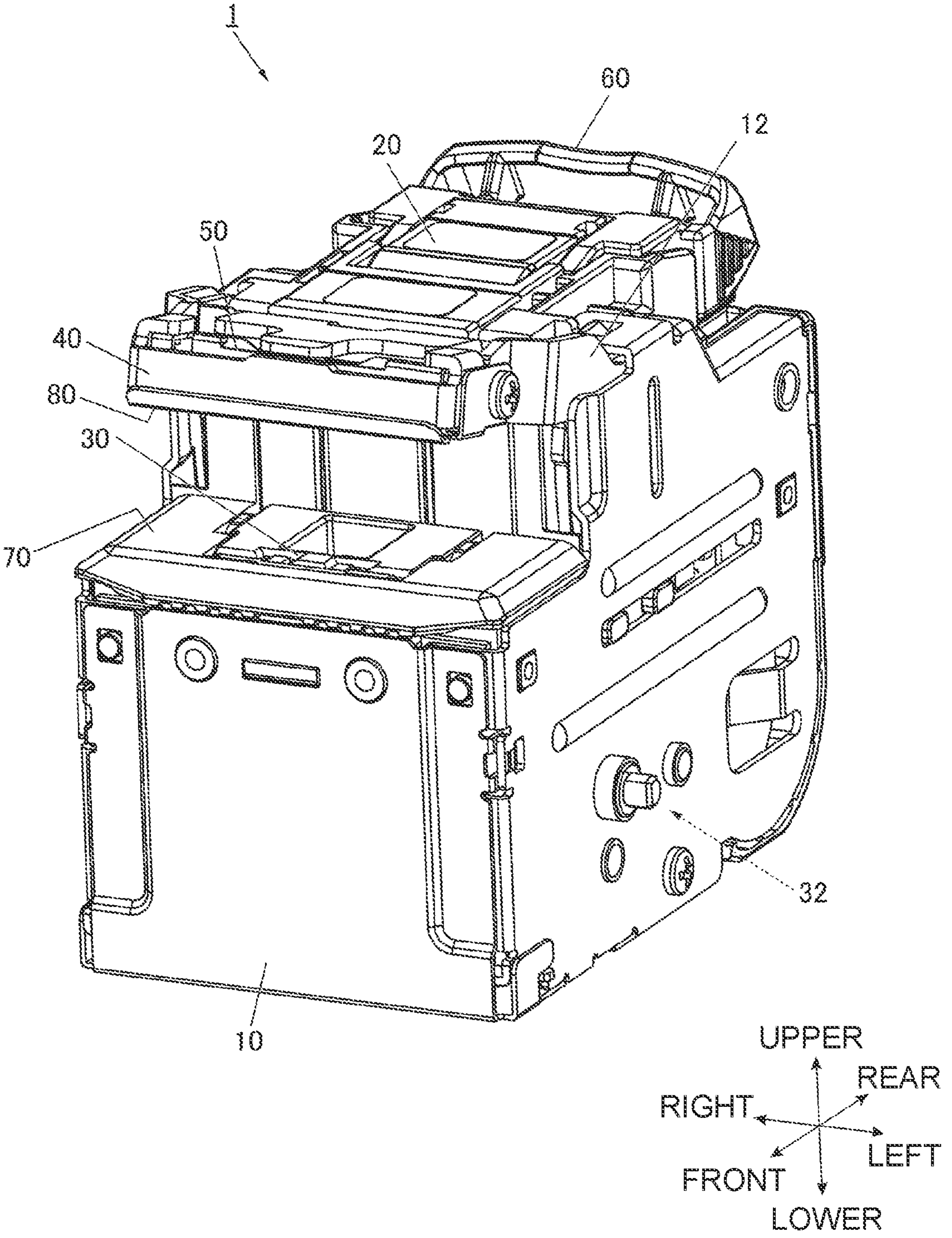
FIG. 1 is a front perspective view of an electric stapler according to the present embodiment.
Figure 2:
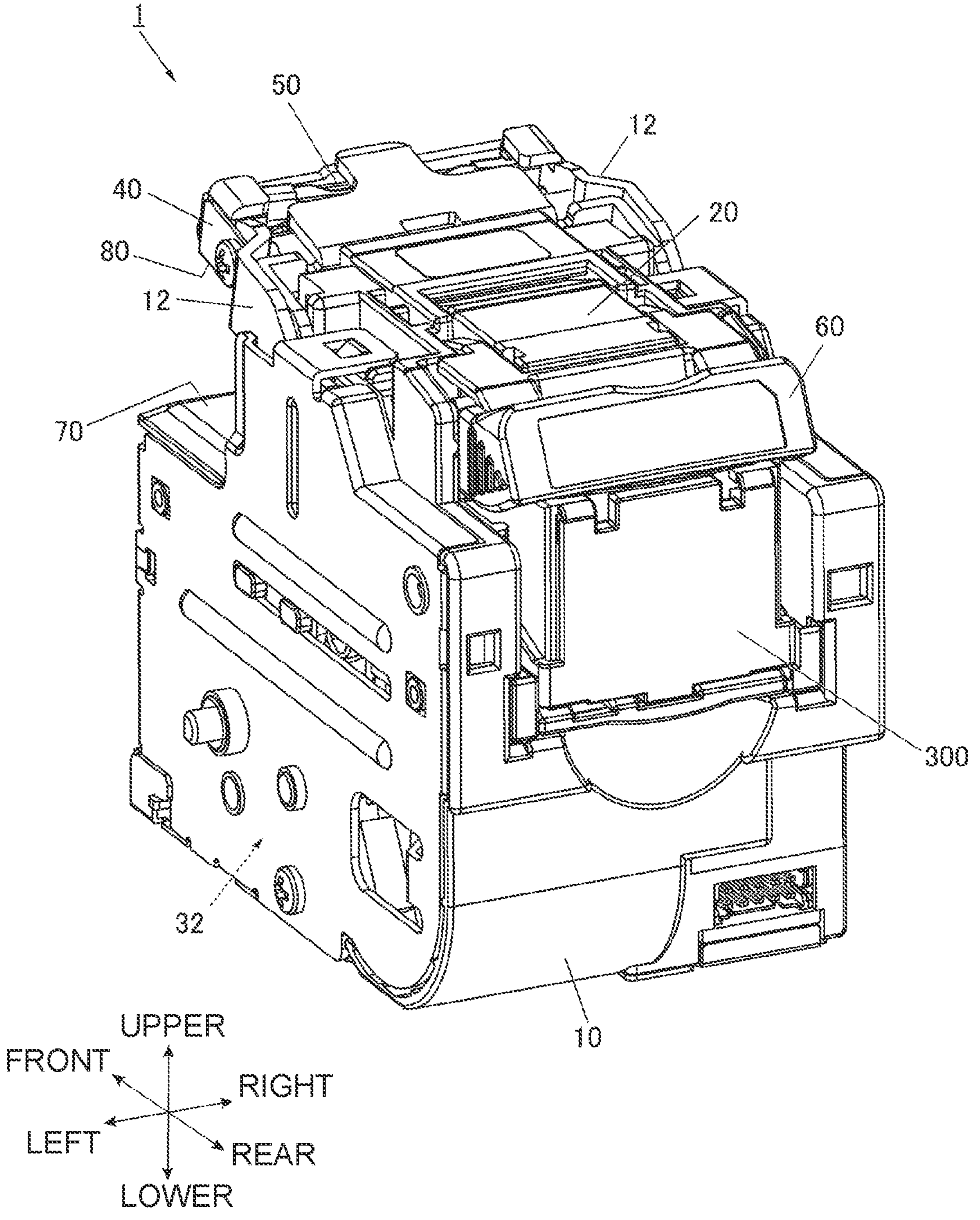
FIG. 2 is a rear perspective view of the electric stapler according to the present embodiment.

As shown in FIGS. 1 and 2, the electric stapler 1 includes a cartridge 20 in which a staple is accommodated, a stapler main body 10 to which the cartridge 20 is detachably attached, and a lever 60 which is provided to the stapler main body 10 so as to be displaceable with respect to the stapler main body 10. Further, the electric stapler 1 includes a driver mechanism 30 that drives a staple toward a sheet bundle, a table 40 that can move up and down with respect to the driver mechanism 30, and a clincher portion 50 that folds leg portions of the staple driven by the driver mechanism 30 and passing through the sheets.

In the present embodiment, a side on which the driver mechanism 30 is provided is a front side of the electric stapler 1, and a side on which the lever 60 is provided is a rear side of the electric stapler 1. A side on which the table 40 and the clincher portion 50 are provided is referred to as an upper side of the electric stapler 1, and an opposite side is referred to as a lower side. In the present embodiment, a first direction D1, which is a displacement direction of the lever 60, is a gravity direction when the electric stapler 1 is placed on a floor surface, and corresponds to a lower side with respect to the cartridge 20. A second direction D2, which is a displacement direction of the lever 60, is a direction opposite to the gravity direction and corresponds to an upper side with respect to the cartridge 20. A third direction D3, which is a displacement direction of the lever 60, is a direction opposite to a loading direction D4 when a direction orthogonal to the first direction D1 is defined as the loading direction D4 of the cartridge 20 into the stapler main body 10, and corresponds to a rear side of the electric stapler 1.

A placement table 70 on which a sheet bundle is placed is provided at a position where the placement table 70 is above the driver mechanism 30 of the stapler main body 10 and faces the table 40. The driver mechanism 30 is disposed on the front side in the stapler main body 10, and is configured to be movable up and down with respect to the placement table 70 based on driving of a drive mechanism 32. The driver mechanism 30 forms a staple into a substantially U-shape by folding both ends of the staple by a forming plate (not shown), and drives the staple formed into the substantially U-shape toward the sheet bundle.

The table 40 is disposed to face upper sides of the driver mechanism 30 and the placement table 70. The table 40 is connected to the drive mechanism 32 via a frame 12, and is configured to be movable in an approaching direction and a separating direction with respect to the placement table 70 based on the driving of the drive mechanism 32. A surface (portion) of the table 40 facing the placement table 70 functions as a clamp portion 80 that clamps the sheet bundle between the surface and the placement table 70. The table 40 and the clamp portion 80 are configured to be movable between a clamping position where the sheet bundle is clamped and a home position where the sheet bundle is not clamped.

The clincher portion 50 is disposed at a front end portion of the table 40 at a position facing the driver mechanism 30. In cooperation with the driver mechanism 30, the clincher portion 50 presses the leg portions of the staple penetrating the sheet bundle and folds the legs portion of the staple inward, thereby binding the sheet bundle by the staple.

The cartridge 20 is detachably attached to a loading portion 110 provided at a rear portion of the stapler main body 10 by being slid from the rear side. A refill 300 on which sheet-type connected staples are stacked is accommodated in the cartridge 20. The refill 300 is configured to be mounted in the cartridge 20 by being slid from the rear side of the cartridge 20. The connected staples in the refill 300 are transported to a forming position by a feed mechanism (not shown) of the driver mechanism 30.

Configuration Example of Stapler Main Body 10

Next, the stapler main body 10 will be described in detail.

Figure 3:
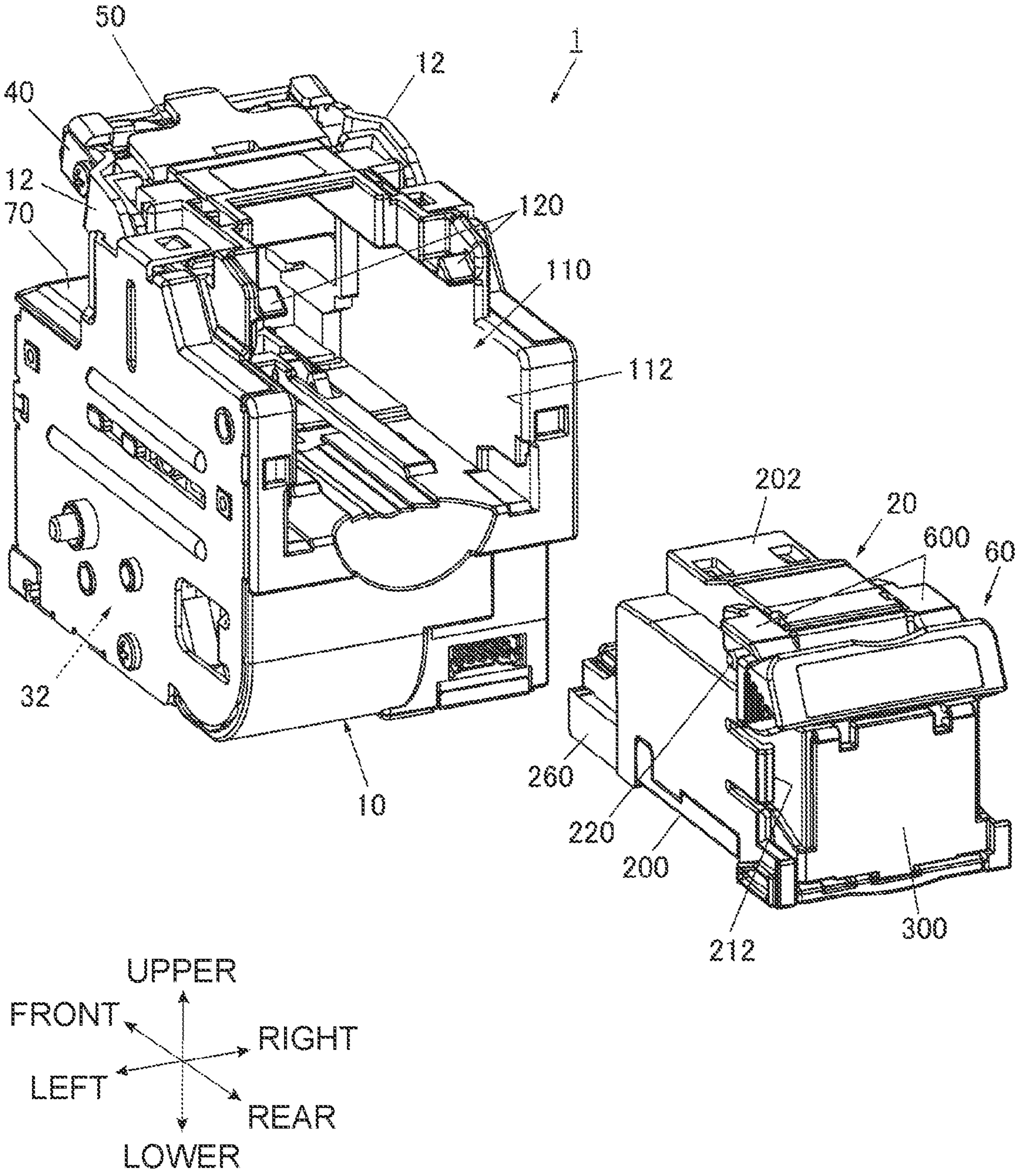
FIG. 3 is a perspective view showing a state in which a cartridge is removed from a stapler main body of the electric stapler according to the present embodiment.

As shown in FIG. 3, the stapler main body 10 includes the loading portion 110 into which the cartridge 20 is loaded, and engagement portions 120 that engage and fixes the cartridges 20 loaded in the loading portion 110 into the loading portion 110.

As shown in FIG. 3, the loading portion 110 is provided in an upper portion of the stapler main body 10 and has a space portion having a size capable of accommodating the cartridge 20. An insertion and removal opening 112 through which the cartridge 20 can be inserted into and removed from the space portion of the loading portion 110 is formed in a rear wall of the stapler main body 10. In the present embodiment, the cartridge 20 can be loaded into the loading portion 110 from the rear side of the stapler main body 10 through the insertion and removal opening 112.

Figure 4:
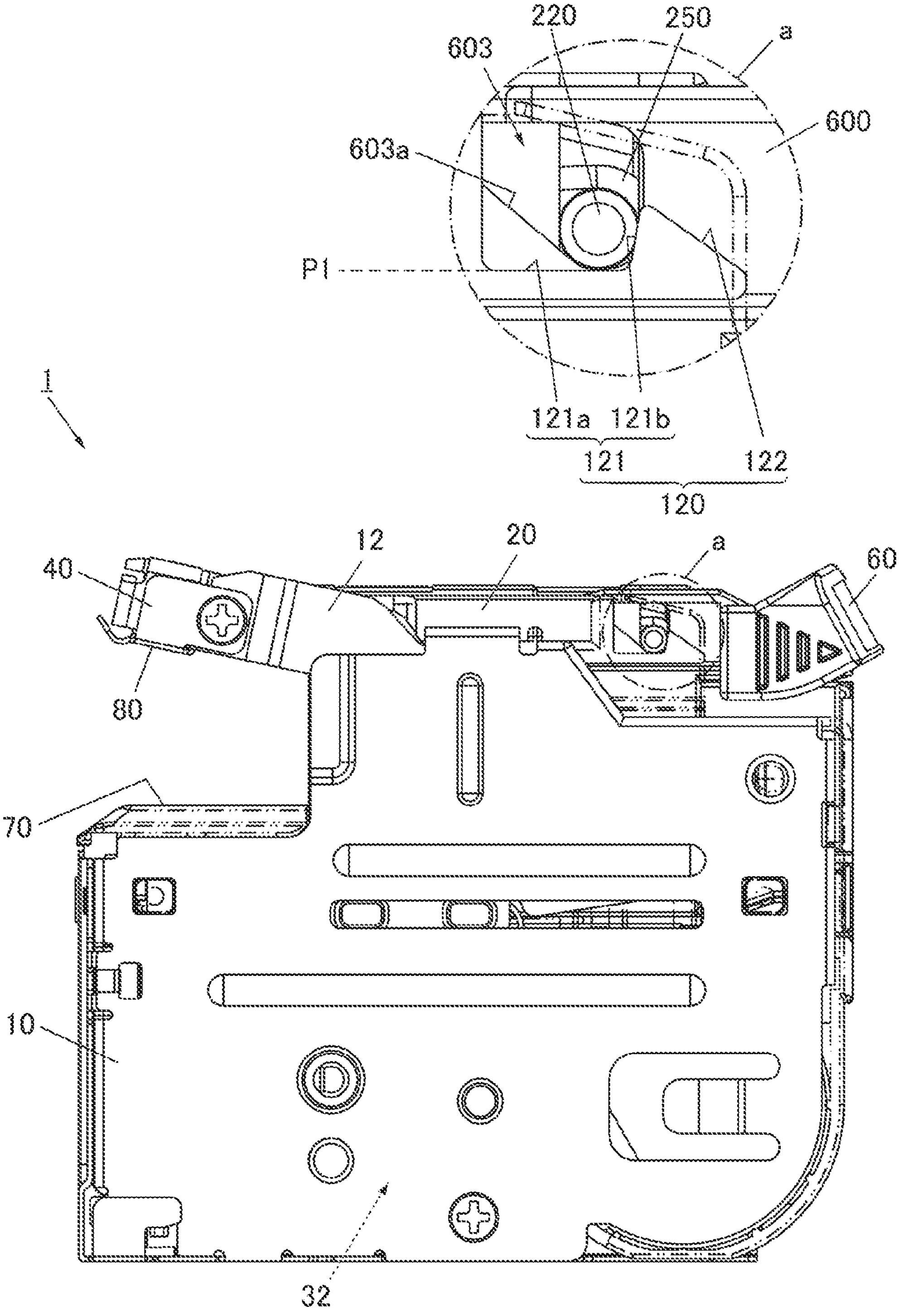
FIG. 4 is a left side view of the electric stapler according to the present embodiment.

As shown in FIGS. 3 and 4, the engagement portions 120 are formed at two positions on one end side and the other end side in a left-right direction of an upper portion of the loading portion 110, and are disposed at positions facing moving portions 603 (to be described later) of the cartridge 20 loaded in the loading portion 110. As shown in FIG. 4, the engagement portion 120 includes a step portion 121 and an inclined surface 122 inclined obliquely downward from an upper end of the step portion 121 toward the rear side. The step portion 121 has a flat surface 121*a* and a substantially vertical surface 121*b* standing from the flat surface 121*a*. A height of the vertical surface 121*b* of the step portion 121 is preferably at least equal to or greater than a radius of a fixing shaft 220 in order to prevent the fixing shaft 220, which will be described later, from coming off rearward from the engagement portion 120. Accordingly, when the cartridge 20 is loaded into the stapler main body 10, the fixing shaft 220 of the cartridge 20 is caught (engaged) by the step portion 121, so that a rearward movement of the fixing shaft 220 is restricted, and the cartridge 20 can be locked to the stapler main body 10.

Configuration Example of Cartridge 20

Next, the cartridge 20 will be described in detail.

Figure 5:
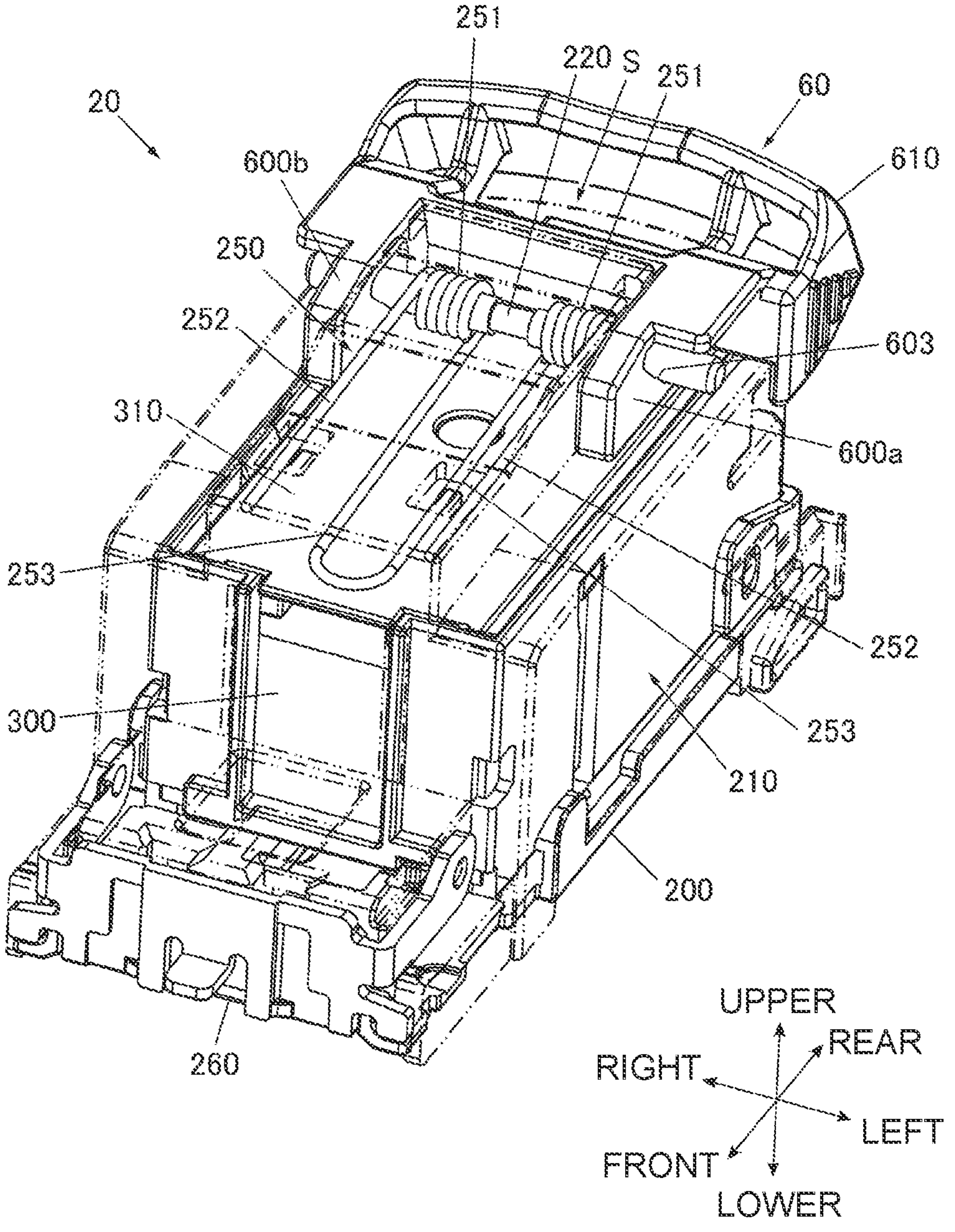
FIG. 5 is a perspective view showing the inside of the cartridge according to the present embodiment.
Figure 6:
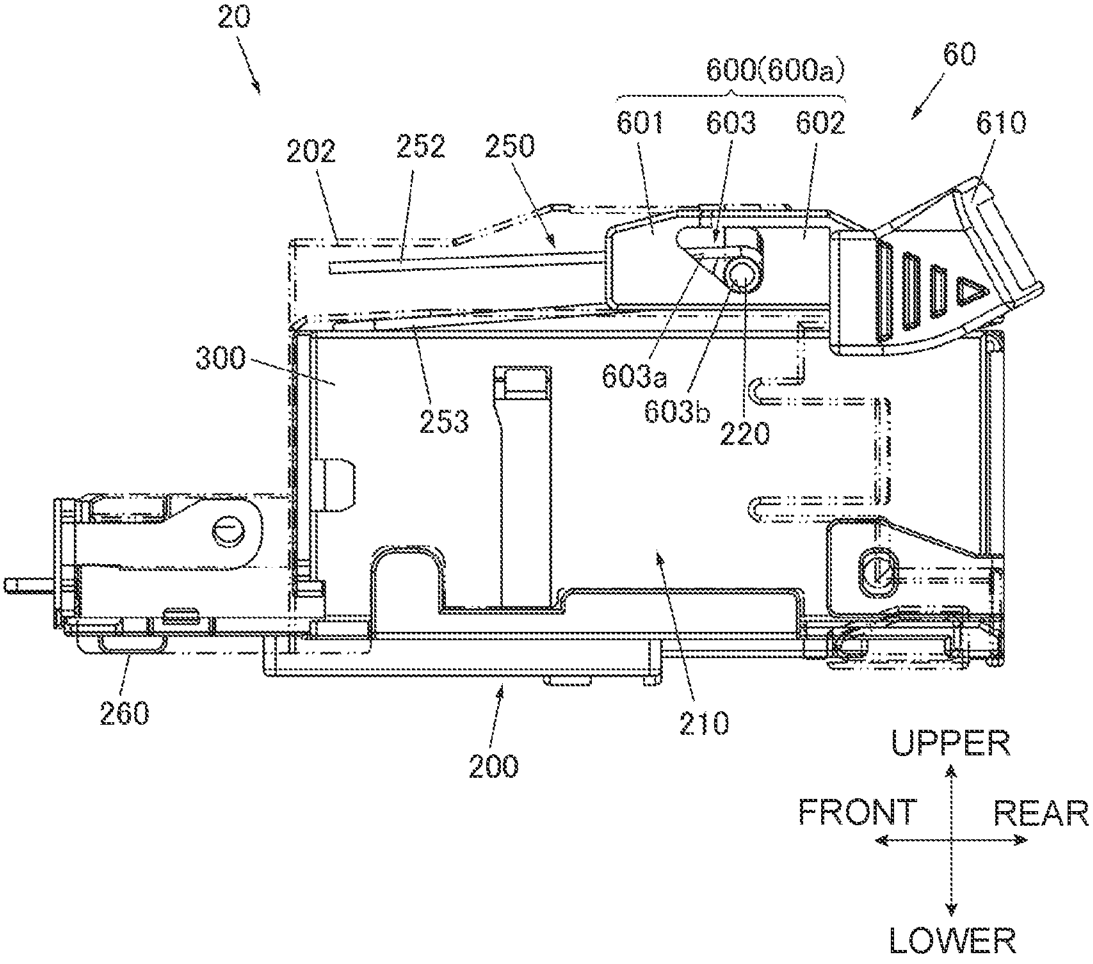
FIG. 6 is a left side view showing the inside of the cartridge according to the present embodiment.

As shown in FIGS. 5 and 6, the cartridge 20 includes a cartridge main body 200, a refill accommodating portion 210 that accommodates a refill, the lever 60 that is attached to the cartridge main body 200 so as to be displaceable with respect to the cartridge main body 200, the fixing shaft 220 for fixing the cartridge 20 to the stapler main body 10 when the cartridge 20 is loaded into the stapler main body 10, a torsion coil spring 250 that urges the fixing shaft 220 to a position where the fixing shaft 220 is engaged with and fixed to the engagement portion 120, and a discharge portion 260 that discharges a staple.

As shown in FIGS. 3 and 5, the refill accommodating portion 210 is provided inside the cartridge main body 200 and includes a space portion having a size capable of accommodating the refill 300. An insertion and removal opening 212 (see FIG. 3) through which the refill 300 can be inserted into and pulled out from the space portion of the refill accommodating portion 210 is formed in a rear wall of the cartridge main body 200. In the present embodiment, the refill 300 can be loaded into the refill accommodating portion 210 from the rear side of the cartridge main body 200 through the insertion and removal opening 212.

Here, the refill 300 is formed by a box body capable of accommodating the connected staples to which linear staples are connected. A large number of connected staples are stacked in the refill 300. The refill 300 includes a lid member 310 for pressing the uppermost connected staple among the stacked connected staples. The lid member 310 is configured to be movable up and down in the refill 300 by increasing or decreasing the number of connected staples in the refill 300.

The fixing shaft 220 is an example of a protruding portion and a fixing portion, and is disposed above the refill accommodating portion 210 and at a rear portion of the cartridge main body 200 as shown in FIGS. 5 and 6. The protruding portion in the present embodiment is a round bar, but is not limited thereto. The protruding portion may be a triangular protrusion or a quadrangular protrusion. The fixing shaft 220 is disposed such that a longitudinal direction thereof extends along the left-right direction of the cartridge main body 200. The torsion coil spring 250 is attached to a substantially central portion of the fixing shaft 220. A left end side (one end portion) of the fixing shaft 220 is inserted into a vertically long hole (hereinafter, referred to as a long hole) provided in a left side wall connected to an upper wall 202 of the cartridge main body 200. The left end side of the fixing shaft 220 inserted into the long hole is movably inserted into one lever main body 600 (an extending portion **600*a* to be described later) constituting the lever 60, and further protrudes outward. A right end side (right end portion) of the fixing shaft 220 is inserted into a vertically long hole provided in a right side wall connected to the upper wall 202 of the cartridge main body 200. The right end side of the fixing shaft 220 inserted into the long hole is movably inserted into the other lever main body 600 (an extending portion 600*b* to be described later) constituting the lever 60**, and further protrudes outward.

As shown in FIG. 5, the torsion coil spring 250 includes coil portions 251, fixed arms 252 each extending from one end side of the coil portion 251 toward a front side of the refill accommodating portion 210, and load arms 253 each extending from the other end side of the coil portion 251 toward the front side of the refill accommodating portion 210. The torsion coil spring 250 is an example of an elastic member. Although the torsion coil spring is used in the present embodiment, the elastic member may be a plate spring or a rubber member. The fixed arm 252 is located above the load arm 253. In the present embodiment, the torsion coil spring 250 having the two coil portions 251 is used, the fixing shaft 220 is disposed to penetrate the coil portions 251, and the load arms 253 are configured to be substantially in a center in a cartridge left-right direction. The configuration of the torsion coil spring 250 is not limited to the configuration of the present embodiment.

A distal end side of the fixed arm 252 is in contact with the upper wall 202 (see FIG. 2 and the like) of the cartridge main body 200. The fixed arm 252 is elastically deformable with a contact point as a fulcrum, and urges the fixing shaft 220 downward on the refill accommodating portion 210 side. Accordingly, as shown in FIG. 4, both end sides of the fixing shaft 220 abut on opening edges of the moving portions 603 of the lever main body 600, and are disposed at positions where the fixing shaft 220 is engageable with the engagement portions 120.

Figure 8:
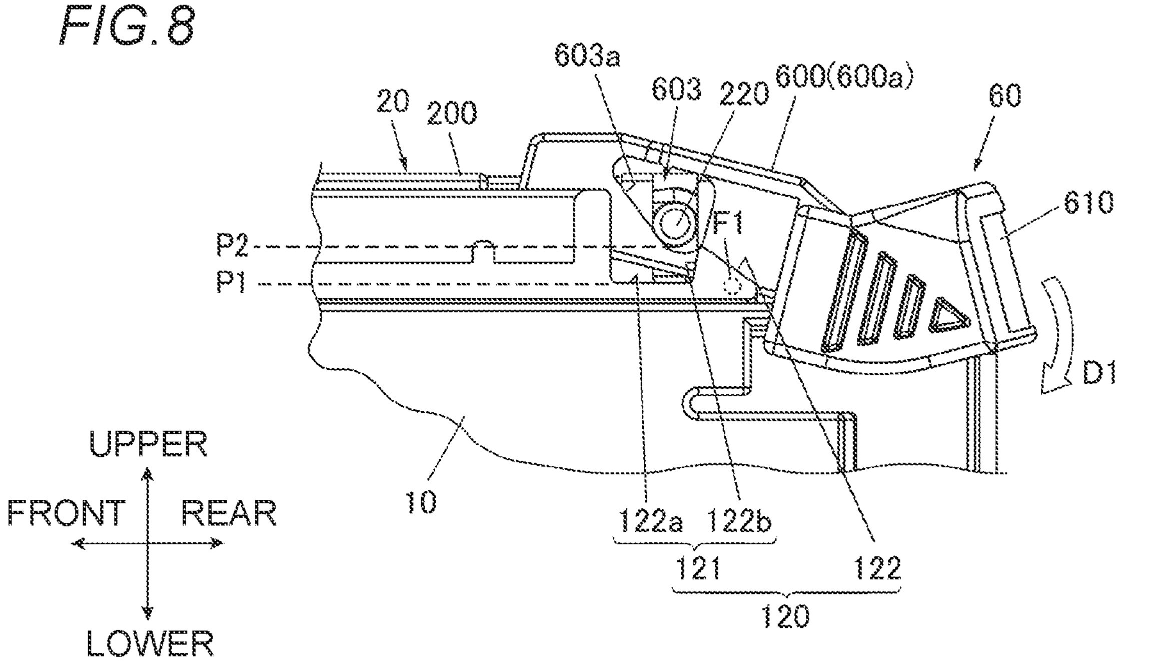
FIG. 8 is an operation diagram of the electric stapler when a lever according to the present embodiment is rotated in a first direction to remove the cartridge from the stapler main body.

As described above, in the present embodiment, when the fixing shaft 220 is fixed by the engagement portion 120 of the cartridge main body 200, the fixing shaft 220 is located at a first position P1 by an urging force of the torsion coil spring 250. When the fixing of the fixing shaft 220 to the engagement portion 120 of the cartridge main body 200 is released, the fixing shaft 220 is located at a second position P2 against an elastic force of the torsion coil spring 250 as shown in FIG. 8. The first position P1 is located below the second position P2. After the lock by the engagement portion 120 is released, the fixing shaft 220 moves from the second position to the first position.

As shown in FIG. 5, the load arm 253 of the torsion coil spring 250 is provided so as to be abuttable on the upper surface of the lid member 310 of the refill 300 loaded in the refill accommodating portion 210, and urges the lid member 310 downward, which is a bottom wall side of the refill 300. Accordingly, when the refill 300 is loaded into the refill accommodating portion 210, the lid member 310 of the refill 300 is pressed by the load arm 253 of the torsion coil spring 250, and the connected staples accommodated in the refill 300 can be held in a stable posture. As described above, in the present embodiment, the torsion coil spring 250 that elastically supports the fixing shaft 220 also serves as an elastic member that presses the lid member 310 of the refill 300. That is, the coil portion 251 of the torsion coil spring 250 functions as an elastic member that abuts against the fixing shaft 220 and urges the fixing shaft 220 to the first position P1, and the load arm 253 functions as an elastic member that urges the lid member 310 of the refill 300 to the bottom wall side of the refill 300.

The discharge portion 260 is disposed in a front portion of the cartridge main body 200. The discharge portion 260 folds a staple located at a leading end portion of the connected staples fed out from the refill 300 in a substantially U-shape in cooperation with the driver mechanism 30, and discharges the staple toward the sheet bundle on the placement table 70.

Configuration Example of Lever 60

Next, the lever 60 will be described in detail.

As shown in FIGS. 4, 5, and 6, the lever 60 is attached above the refill accommodating portion 210 and at the rear portion of the cartridge 20 so as to be displaceable with respect to the stapler main body 10. In the present embodiment, the lever 60 is attached to the cartridge main body 200. When the cartridge 20 is loaded to the stapler main body 10, the lever 60 is displaceable relative to the stapler main body 10. The lever 60 does not necessarily need to be attached to the cartridge, and may be provided on the stapler main body 10. The lever 60 includes a lever main body 600 having distal end portions 601, proximal end portions 602, and the moving portions 603 provided between the distal end portions 601 and the proximal end portions 602, and a knob 610 protruding rearward (in the third direction D3) from the proximal end portion 602.

The lever main body 600 is configured in a substantially U-shape in which a front side of the stapler main body 10 is opened. Left ends and the right ends of the fixing shaft 220 penetrate the lever main body 600. The extending portions 600*a* and 600*b*, which extend to the left and right, face the inner surfaces of the engagement portions 120 and 120 provided at both end portions in the left-right direction of the stapler main body 10 when the cartridge 20 is loaded into the stapler main body 10.

Figure 9:
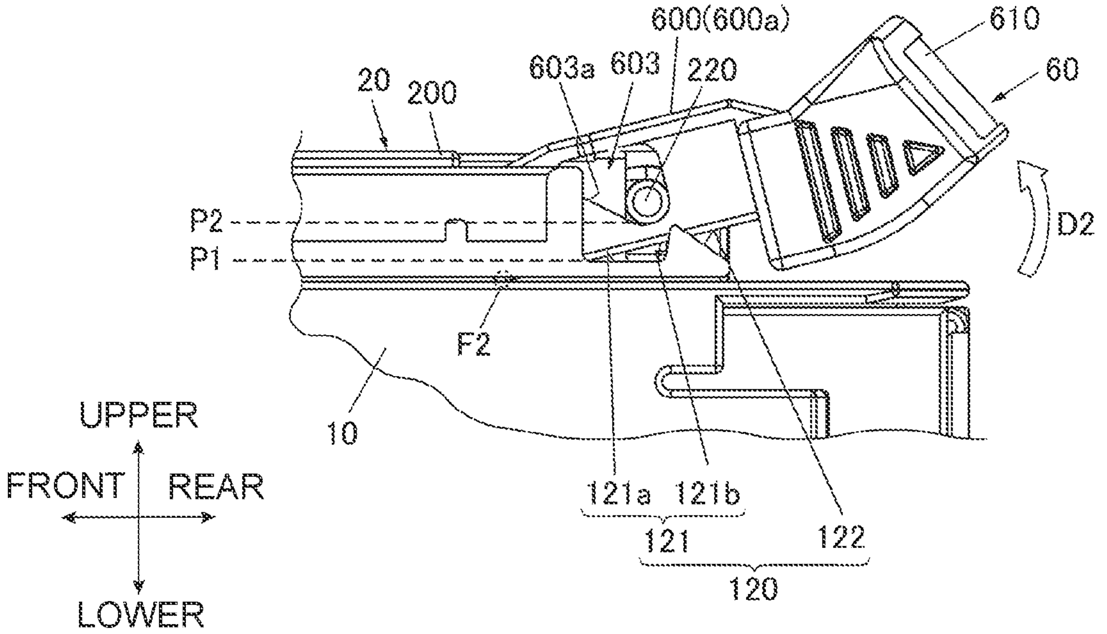
FIG. 9 is an operation diagram of the electric stapler when the lever according to the present embodiment is rotated in a second direction to remove the cartridge from the stapler main body.
Figure 10:
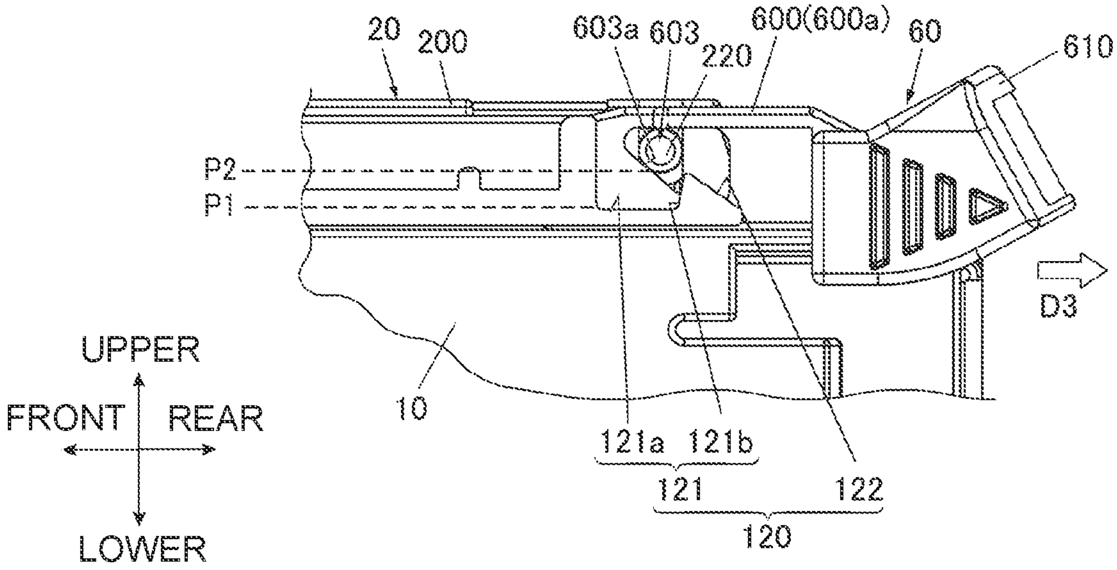
FIG. 10 is an operation diagram of the electric stapler when the cartridge is removed from the stapler main body by pulling the lever according to the present embodiment in a third direction.

The moving portion 603 supports the fixing shaft 220 such that the fixing shaft 220 is movable from the first position P1 to the second position P2 when the lever 60 is displaced downward in the first direction D1 with respect to the stapler main body 10 (see FIG. 8), when the lever 60 is displaced upward in the second direction D2 with respect to the stapler main body 10 (see FIG. 9), or when the lever 60 is displaced rearward in the third direction D3 with respect to the stapler main body 10 (see FIG. 10). In the present embodiment, the moving portion 603 includes an opening portion. A left end portion (one end portion) of the fixing shaft 220 is movably supported by the moving portion 603 of the left extending portion 600*a*. The right end portion (the other end portion) of the fixing shaft 220 is movably supported by the moving portion of the right extending portion 600*b*. The moving portion 603 has, for example, a substantially triangular shape, and has an inclined surface 603*a* inclined obliquely upward from the proximal end portion 602 toward the distal end portion 601. In the moving portion 603, a corner portion 603*b* supporting the fixing shaft 220 at the first position P1 is curved along an arc shape of the fixing shaft 220.

As shown in FIG. 5 and the like, the knob 610 is a portion to be gripped by a user when the cartridge 20 is removed from the stapler main body 10. The knob 610 has a substantially U-shape in a plan view, and both end portions thereof are attached to the rear end sides of the lever main body 600. A gap S into which fingers can be inserted is provided between the knob 610 and the cartridge main body 200 so that the user can easily grip the knob 610. In the present embodiment, the knob 610 is disposed above the refill accommodating portion 210 and at a rear portion of the cartridge 20, so that an amount of protrusion from the rear wall of the stapler main body 10 is prevented. The user grips the knob 610 and rotates or slides the entire lever 60 in any one of the first direction D1, the second direction D2, and the third direction D3, thereby removing the cartridge 20 from the stapler main body 10.

Operation Example of Electric Stapler 1

(When Cartridge 20 is Mounted to Stapler Main Body 10)

Next, a description will be given of a case where the user mounts the cartridge 20 on the stapler main body 10.

When the user moves the cartridge main body 200 to the front side in the direction D4 opposite to the third direction D3 and inserts the cartridge main body 200 into the loading portion 110 of the stapler main body 10, the cartridge 20 moves forward while sliding on a bottom wall of the loading portion 110 of the stapler main body 10 (see FIG. 3). When the cartridge 20 moves forward, the fixing shaft 220 of the cartridge main body 200 moves upward against the elastic force of the fixed arm 252 of the torsion coil spring 250 while sliding on the inclined surface 122 of the engagement portion 120 of the stapler main body 10.

Figure 7:
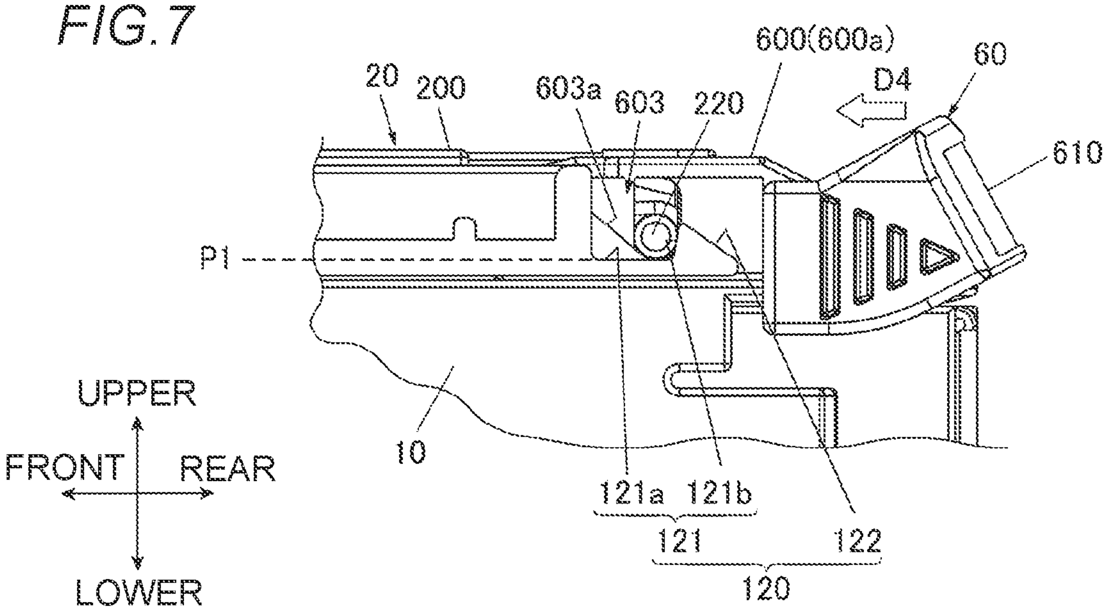
FIG. 7 is a diagram showing a state in which the cartridge is fixed to a loading portion of the stapler main body according to the present embodiment.

When the cartridge 20 further moves forward, the fixing shaft 220 climbs over the inclined surface 122 to the step portion 121 side, and as shown in FIG. 7, the fixing shaft 220 is urged downward by a restoring force of the fixed arm 252 of the torsion coil spring 250 to move to the first position P1. As a result, the fixing shaft 220 is engaged with the step portion 121 of the engagement portion 120, and the cartridge 20 is locked to the stapler main body 10.

(When Lever 60 is Rotated in First Direction D1 to Remove Cartridge 20 From Stapler Main Body 10)

Next, a description will be given of a case where the lever 60 is rotated in the first direction D1 to remove the cartridge 20 from the stapler main body 10. FIG. 8 is a diagram showing an example of an operation of the electric stapler 1 when the lever 60 is rotated in the first direction D1 to remove the cartridge 20 from the stapler main body 10.

As shown in FIG. 8, when the knob 610 of the lever 60 is rotated downward in the first direction D1 by the user in a state where the knob 610 is gripped, the knob 610 side rotates downward (clockwise) about a first fulcrum F1 with respect to the cartridge main body 200. Here, the first fulcrum F1 is a point where a proximal end side of a lower surface of the lever main body 600 (the extending portion 600*a*) and the upper surface of the cartridge main body 200 are in contact with each other, and is located behind the moving portion 603. Accordingly, the lever main body 600 side of the lever 60 moves upward, and the fixing shaft 220 supported by the moving portion 603 of the lever main body 600 is pushed up against the elastic force of the torsion coil spring 250. As a result, the fixing shaft 220 is moved to the second position P2 higher than the step portion 121 of the engagement portion 120, and the fixing shaft 220 is disengaged from the engagement portion 120 of the stapler main body 10.

In this state, when the knob 610 is pulled rearward in the third direction D3, the cartridge 20 moves rearward, and the fixing shaft 220 climbs over the step portion 121 of the engagement portion 120 and descends while sliding on the inclined surface 122. The fixing shaft 220 gradually moves downward by the restoring force of the torsion coil spring 250, and returns to the first position P1 when passing through the inclined surface 122. When the cartridge 20 is further pulled rearward, the cartridge 20 is removed from the loading portion 110 of the stapler main body 10.

(When Lever 60 is Rotated in Second Direction D2 to Remove Cartridge 20 From Stapler Main Body 10)

Next, a description will be given of a case where the lever 60 is rotated in the second direction D2 to remove the cartridge 20 from the stapler main body 10. FIG. 9 is a diagram showing an example of an operation of the electric stapler 1 when the lever 60 is rotated in the second direction D2 to remove the cartridge 20 from the stapler main body 10.

As shown in FIG. 9, when the lever 60 is rotated upward in the second direction D2 by the user in a state where the lever 60 is gripped, the lever 60 rotates upward (counterclockwise) about a second fulcrum F2 with respect to the cartridge main body 200. Here, the second fulcrum F2 is a point where a distal end side of the lower surface of the lever main body 600 (the extending portion 600*a*) and the upper surface of the cartridge main body 200 are in contact with each other, and is located in front of the moving portion 603.

Accordingly, the fixing shaft 220 supported by the moving portion 603 of the lever 60 is pushed up against the elastic force of the torsion coil spring 250, and the fixing shaft 220 moves to the second position P2 higher than the step portion 121 of the engagement portion 120. As a result, the fixing shaft 220 is disengaged from the engagement portion 120 of the stapler main body 10.

In this state, when the cartridge 20 is pulled rearward in the third direction D3, the cartridge 20 moves rearward, and the fixing shaft 220 climbs over the step portion 121 of the engagement portion 120 and moves downward while sliding on the inclined surface 122. The fixing shaft 220 gradually moves downward by the restoring force of the torsion coil spring 250, and returns to the first position P1 when passing through the inclined surface 122. When the cartridge 20 is further pulled rearward, the cartridge 20 is removed from the loading portion 110 of the stapler main body 10.

(When Lever 60 is Rotated in Third Direction D3 to Remove Cartridge 20 From Stapler Main Body 10)

Next, a description will be given of a case where the lever 60 is pulled in the third direction D3 to remove the cartridge 20 from the stapler main body 10. FIG. 10 is a diagram showing an example of an operation of the electric stapler 1 when the lever 60 is pulled in the third direction D3 to remove the cartridge 20 from the stapler main body 10.

As shown in FIG. 10, when the user pulls the lever 60 rearward in the third direction D3 in a state where the knob 610 of the lever 60 is gripped, the lever 60 moves rearward with respect to the cartridge main body 200. That is, the moving portion 603 of the lever 60 moves relative to the fixing shaft 220 of the cartridge main body 200. Accordingly, the fixing shaft 220 supported by the moving portion 603 of the lever main body 600 rises while sliding on the inclined surface 603*a* of the moving portion 603 against the elastic force of the torsion coil spring 250. As a result, the fixing shaft 220 moves to the second position P2 higher than the step portion 121 of the engagement portion 120, and the fixing shaft 220 is disengaged from the engagement portion 120 of the stapler main body 10.

In this state, when the lever 60 is further pulled rearward in the third direction D3, the entire cartridge 20 moves rearward, and the fixing shaft 220 climbs over the step portion 121 of the engagement portion 120 and moves downward while sliding on the inclined surface 122. The fixing shaft 220 gradually moves downward on the inclined surface 122 by the restoring force of the torsion coil spring 250, and returns to the first position P1 when passing through the inclined surface 122. When the cartridge 20 is further pulled rearward, the cartridge 20 is removed from the loading portion 110 of the stapler main body 10.

As described above, according to the present embodiment, when the cartridge 20 is removed from the stapler main body 10, one of the three types of operations of the lever 60 in the first direction, the second direction, and the third direction can be selected. As described above, by realizing various operability, it is possible to prevent erroneous operation when the user removes the cartridge 20, to reliably remove the cartridge 20 from the stapler main body 10, and to prevent damage to the electric stapler 1.

According to the present embodiment, since the knob 610 of the lever 60 is disposed substantially above the refill accommodating portion 210 and at the rear portion of the cartridge 20, the mount of protrusion from the rear wall of the stapler main body 10 is prevented. Accordingly, the electric stapler 1 can be downsized as compared with a configuration of the related art in which the knob 610 protrudes outward from the rear wall of the stapler main body 10.

According to the present embodiment, since the torsion coil spring 250 provided in the cartridge 20 has both the function of urging the fixing shaft 220 to the first position P1 and the function of pressing the lid member 310 of the refill 300, it is possible to reduce the number of components as compared with the case where the elastic member is used for each of the fixing shaft 220 and the lid member 310. Accordingly, it is possible to reduce the cost of the electric stapler 1 including the cartridge 20 compared to the related art.

Although the preferred embodiment of the present disclosure has been described in detail above with reference to the accompanying drawings, the technical scope of the present disclosure is not limited thereto. It is apparent that a person having ordinary knowledge in the technical field of the present disclosure can conceive various changes or modifications within the scope of the technical idea described in the claims, and it is understood that the changes or modifications naturally belong to the technical scope of the present disclosure.

For example, although an example in which the fixing shaft 220 and the lever 60 for fixing and releasing the cartridge 20 to and from the stapler main body 10 are provided on the cartridge 20 side has been described in the embodiment described above, the present disclosure is not limited thereto, and the fixing shaft 220 and the lever 60 may be provided on the stapler main body 10 side. Specifically, the electric stapler 1 may include the stapler main body 10 including the loading portion 110 into which the cartridge 20 is loaded and the fixing shaft 220 that fixes the cartridge 20 loaded into the loading portion 110 to the loading portion 110, and the lever 60 attached to the stapler main body 10 so as to be displaceable with respect to the stapler main body 10. In this case, the fixing shaft 220 has the protruding portion that is located at the first position P1 when the cartridge 20 is fixed to the loading portion 110 and is located at the second position P2 when the fixing of the cartridge 20 is released. The lever 60 includes the moving portion 603 that moves the fixing shaft 220 from the first position P1 to the second position P2 when the lever 60 is displaced in the first direction D1, in the second direction D2, and in the third direction D3 with respect to the stapler main body 10.

What is claimed is:

1. A cartridge to be mounted on a stapler, comprising:

a cartridge main body configured to accommodate a staple;

a lever attached to the cartridge main body to be displaceable with respect to the cartridge main body; and a fixing portion for fixing the cartridge to the stapler when the cartridge is loaded on the stapler, wherein the fixing portion is located at a first position in a fixed state where the cartridge is fixed to the stapler, and is located at a second position in a released state where the fixed state is released, the lever has a moving portion that moves the fixing portion to the second position when the lever is displaced in a first direction or a second direction with respect to the cartridge main body, the fixing portion has a fixing shaft that protrudes outward from the moving portion, the fixing shaft abuts against the moving portion until the fixing shaft is displaced from the first position to the second position, the moving portion includes a through hole that has an inclined surface inclined obliquely in an upper-lower direction and a corner portion that supports the fixing shaft at the first position, and the fixing shaft is inserted in the through hole.

2. The cartridge according to claim 1, wherein the first direction is downward with respect to the cartridge main body, and the second direction is upward with respect to the cartridge main body.

3. The cartridge according to claim 2, wherein
the moving portion moves the fixing portion to the second position when the lever is displaced in a third direction with respect to the cartridge main body.

4. The cartridge according to claim 3, wherein
a loading direction in which the cartridge is loaded into the stapler is a direction intersecting the first direction, and
the third direction is a direction opposite to the loading direction.

5. The cartridge according to claim 4, wherein
the first position is located in the first direction with respect to the second position, and
the moving portion moves the fixing portion in the second direction when the lever is displaced in the first direction, the second direction, and the third direction with respect to the stapler.

6. The cartridge according to claim 4, wherein
the lever includes a lever main body having a proximal end portion, a distal end portion, the moving portion between the proximal end portion and the distal end portion, and a knob protruding from the proximal end portion in the third direction,
the lever main body has a first fulcrum portion closer to the proximal end portion side than the moving portion,
the knob is rotatable in the first direction around the first fulcrum portion as a fulcrum, and
the moving portion moves in the second direction as the knob rotates in the first direction.

7. The cartridge according to claim 4, wherein
the lever includes a lever main body having a proximal end portion, a distal end portion, the moving portion between the proximal end portion and the distal end portion, and a knob protruding from the proximal end portion in the third direction,
the lever main body has a second fulcrum portion closer to the distal end portion side than the moving portion,
the knob is rotatable in the second direction around the second fulcrum portion as a fulcrum, and
the moving portion moves in the second direction as the knob rotates in the second direction.

8. The cartridge according to claim 4, wherein
the fixing portion is located closer to the second direction than the staple accommodated in the cartridge main body.

9. The cartridge according to claim 3, wherein
the lever includes a lever main body having a proximal end portion, a distal end portion, the moving portion between the proximal end portion and the distal end portion, and a knob protruding from the proximal end portion in the third direction,
the moving portion has an inclined surface inclined in the second direction from the proximal end portion toward the distal end portion, and
the fixing portion abuts against the inclined surface and moves in the second direction along the inclined surface when the lever is displaced in the third direction.

10. The cartridge according to claim 3, further comprising
an elastic member configured to urge the fixing portion to the first position,
wherein the elastic member presses the staple accommodated in the cartridge main body in the first direction.

11. A stapler comprising:
a main body including a loading portion in which a cartridge is loaded and a fixing portion that fixes the cartridge loaded in the loading portion into the loading portion; and
a lever attached to the main body to be displaceable with respect to the main body, wherein
the fixing portion has a protruding portion that is located at a first position in a fixed state where the cartridge is fixed to the loading portion and is located at a second position in a released state where the fixed state of the cartridge is released,
the lever has a moving portion that moves the protruding portion from the first position to the second position when the lever is displaced in a first direction or a second direction different from the first direction with respect to the main body,
the fixing portion has a fixing shaft that protrudes outward from the moving portion,
the fixing shaft abuts against the moving portion until the fixing shaft is displaced from the first position to the second position,
the moving portion includes a through hole that has an inclined surface inclined obliquely in an upper-lower direction and a corner portion that supports the fixing shaft at the first position, and
the fixing shaft is inserted in the through hole.

* * * * *